(12) United States Patent  
Nakanishi et al.

(10) Patent No.: US 7,950,931 B2
(45) Date of Patent: May 31, 2011

(54) ELECTRICAL JUNCTION BOX WITH DRAINAGE PORTIONS

(75) Inventors: Ryuji Nakanishi, Yokkaichi (JP); Shigeki Yamane, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 251 days.

(21) Appl. No.: 12/382,619

(22) Filed: Mar. 19, 2009

(65) Prior Publication Data

US 2009/0298310 A1 Dec. 3, 2009

(30) Foreign Application Priority Data

May 27, 2008 (JP) .................................. 2008-138497

(51) Int. Cl.
*H01R 12/00* (2006.01)
(52) U.S. Cl. ...................................................... 439/76.2
(58) Field of Classification Search .................. 439/76.2, 439/76.1, 190, 206
See application file for complete search history.

(56) References Cited

U.S. PATENT DOCUMENTS

| | | | | |
|---|---|---|---|---|
| 4,952,753 A * | 8/1990 | Hayashi et al. | ................ | 174/559 |
| 5,159,155 A * | 10/1992 | Nishihara | ........................ | 174/50 |
| 6,796,809 B2 | 9/2004 | Kakuta et al. | | |
| 7,074,053 B2 * | 7/2006 | Kawakita et al. | ............. | 439/76.1 |
| 7,156,677 B2 * | 1/2007 | Yamane | ........................ | 439/206 |
| 7,357,650 B2 * | 4/2008 | Sasaki et al. | ................. | 439/76.2 |
| 7,364,438 B2 * | 4/2008 | Sasaki et al. | ................. | 439/76.1 |
| 7,514,629 B2 * | 4/2009 | Sasaki et al. | .................... | 174/50 |
| 7,532,458 B2 * | 5/2009 | Sasaki et al. | .................. | 361/622 |
| 2008/0299800 A1 * | 12/2008 | Yoshida et al. | .............. | 439/76.2 |
| 2009/0298311 A1 * | 12/2009 | Nakanishi et al. | ........... | 439/76.2 |

FOREIGN PATENT DOCUMENTS

JP A-2003-348732 12/2003

* cited by examiner

*Primary Examiner* — Edwin A. Leon
*Assistant Examiner* — Vanessa Girardi
(74) *Attorney, Agent, or Firm* — Oliff & Berridge, PLC

(57) ABSTRACT

The present invention provides an electrical junction box that can prevent water in a casing from attaching to a circuit board. The electrical junction box may include a casing, an upper connector housing and fuse-mounting sections that are disposed on and are open in an upper wall in the casing, a circuit board contained in the casing, an upper frame portion that is disposed below the upper connector housing and fuse-mounting sections in the casing to cover an upper part of the circuit board, side frame portions that extend downward from side edges of the upper frame portion and are disposed adjacent to sides of the circuit board, slopes that are formed on an upper surface of the upper frame portion and slant down to the side frame portions, and groove portions that extend in a vertical direction on outer surfaces of the side frame portions. The casing may be provided with first drainage portions that are open at positions opposite lower end edges of the groove portions.

14 Claims, 18 Drawing Sheets

[Fig. 1]
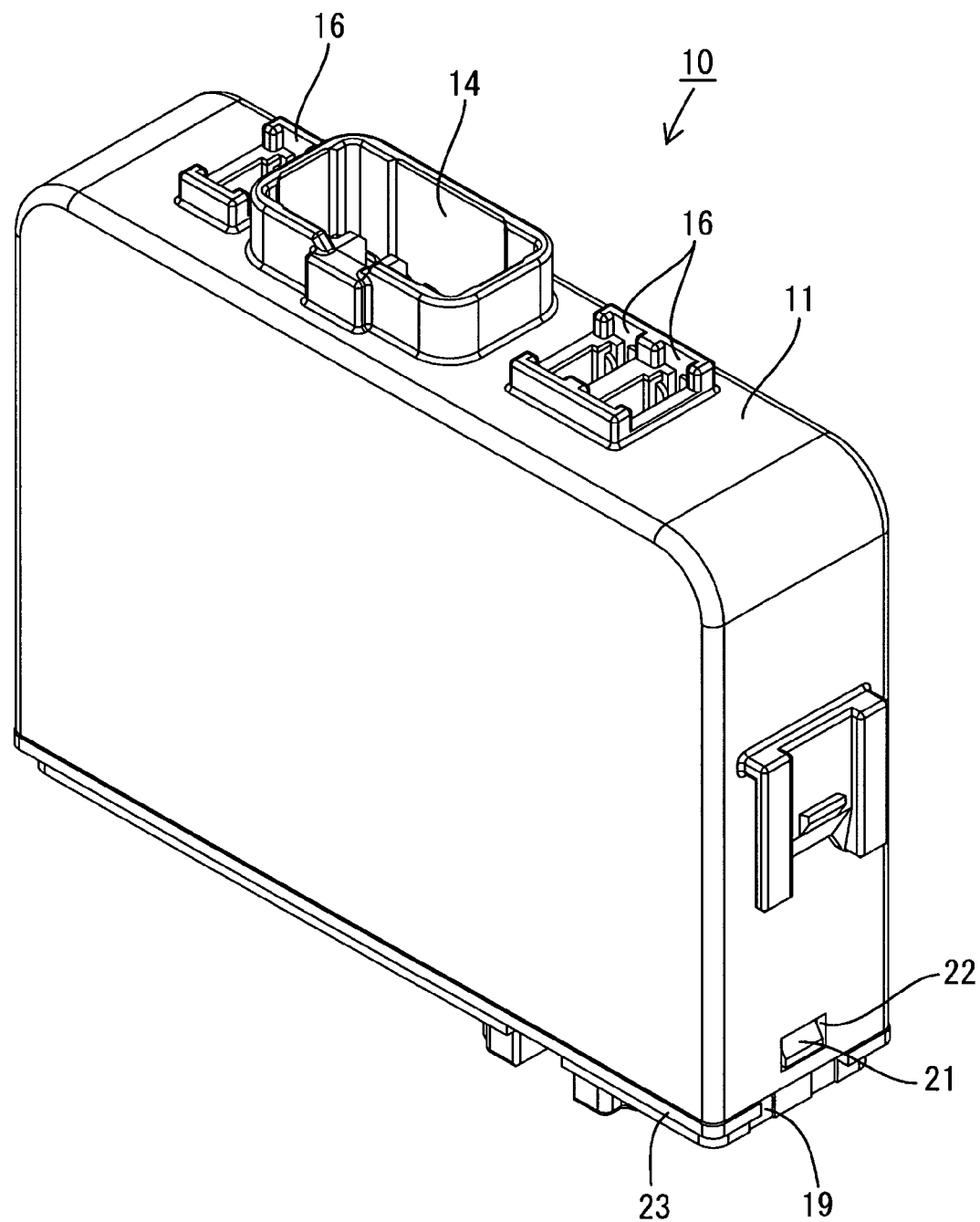

[Fig. 2]
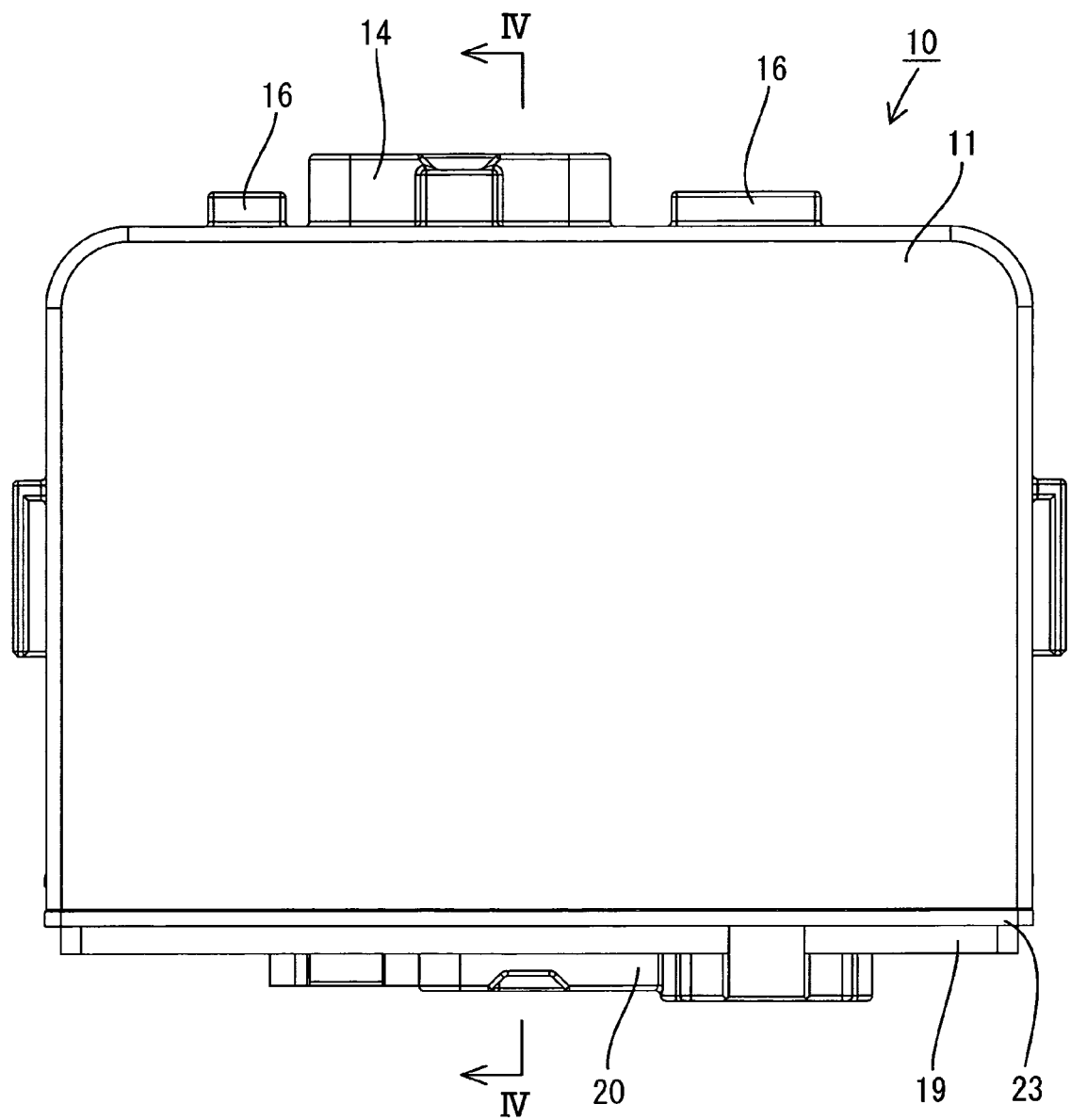

[Fig. 3]
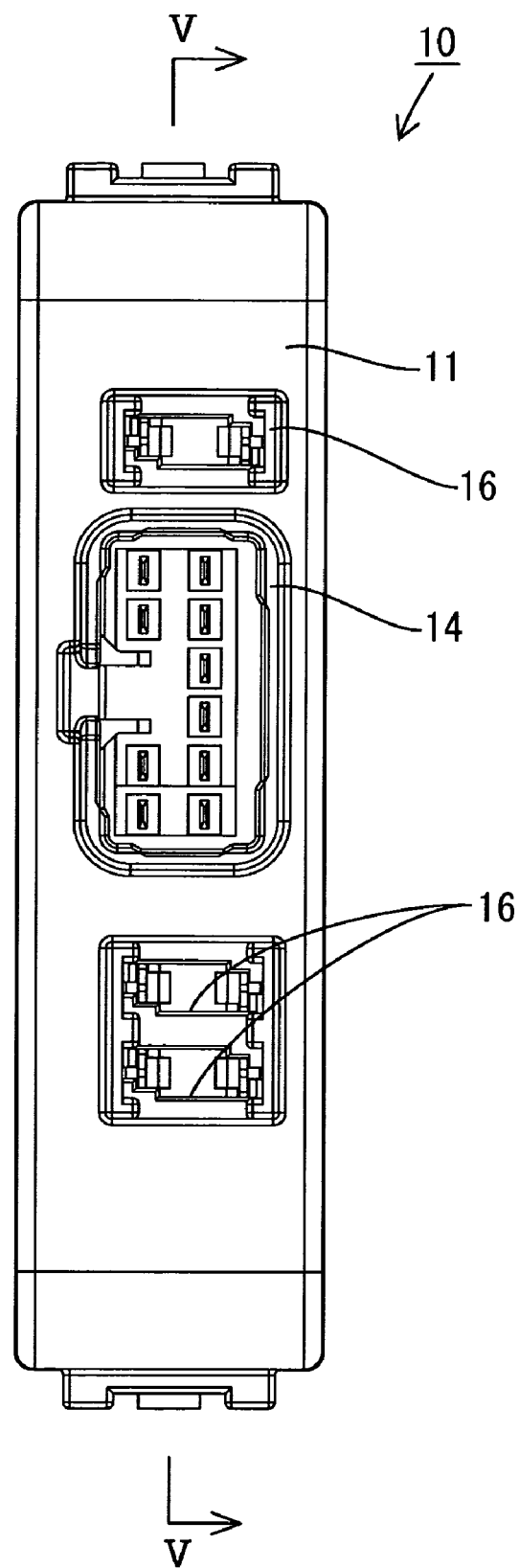

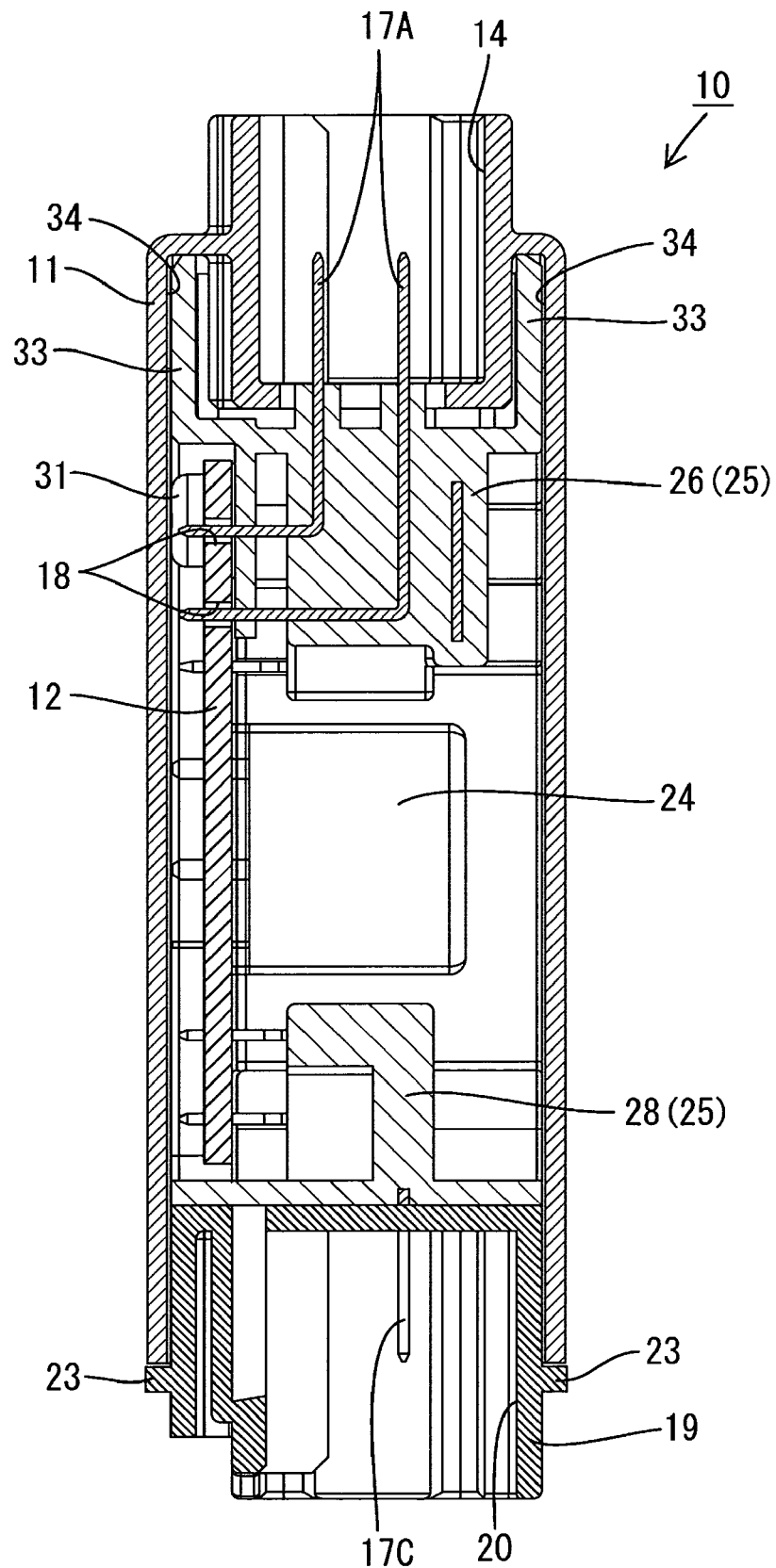
[Fig. 4]

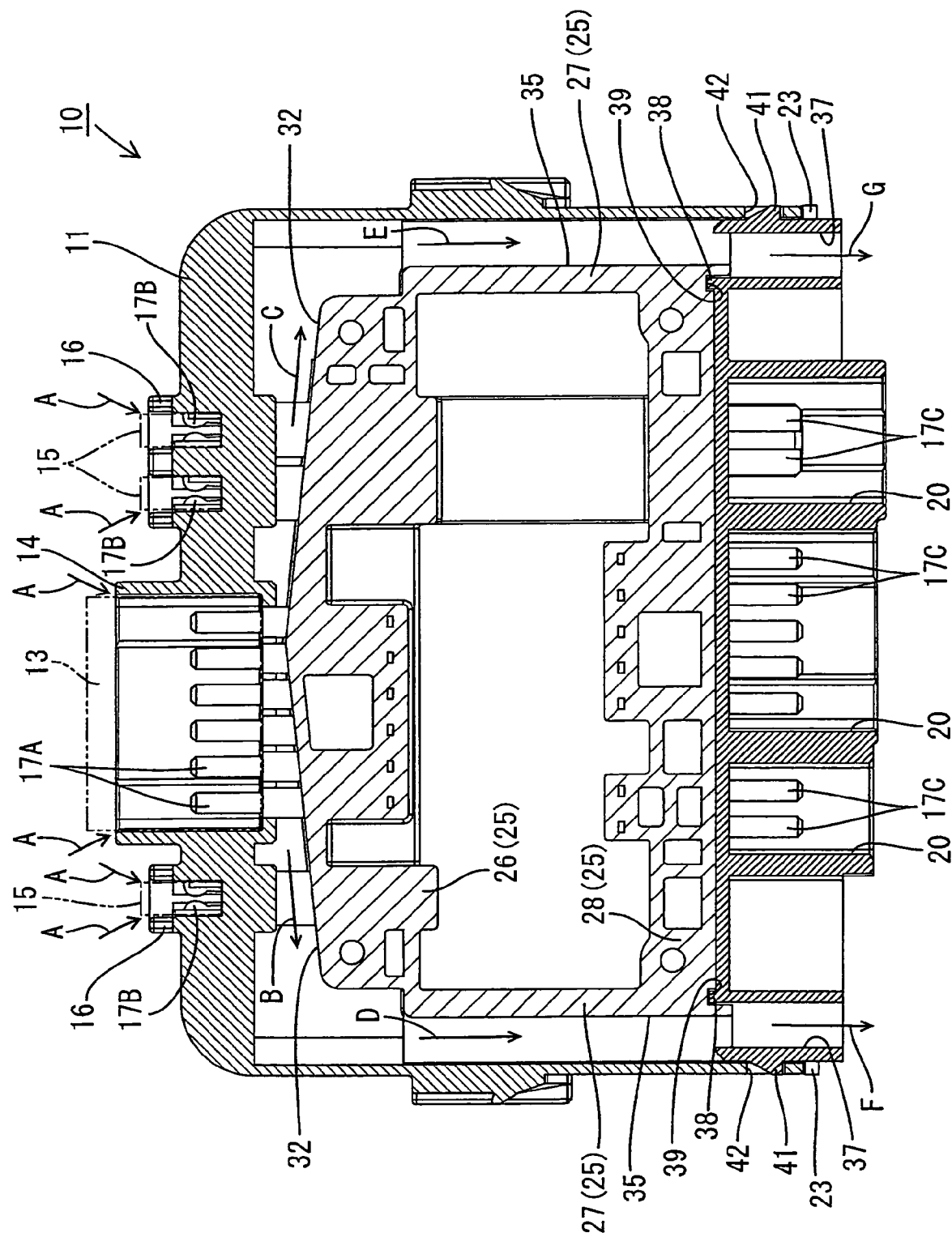
[Fig. 5]

[Fig. 6]
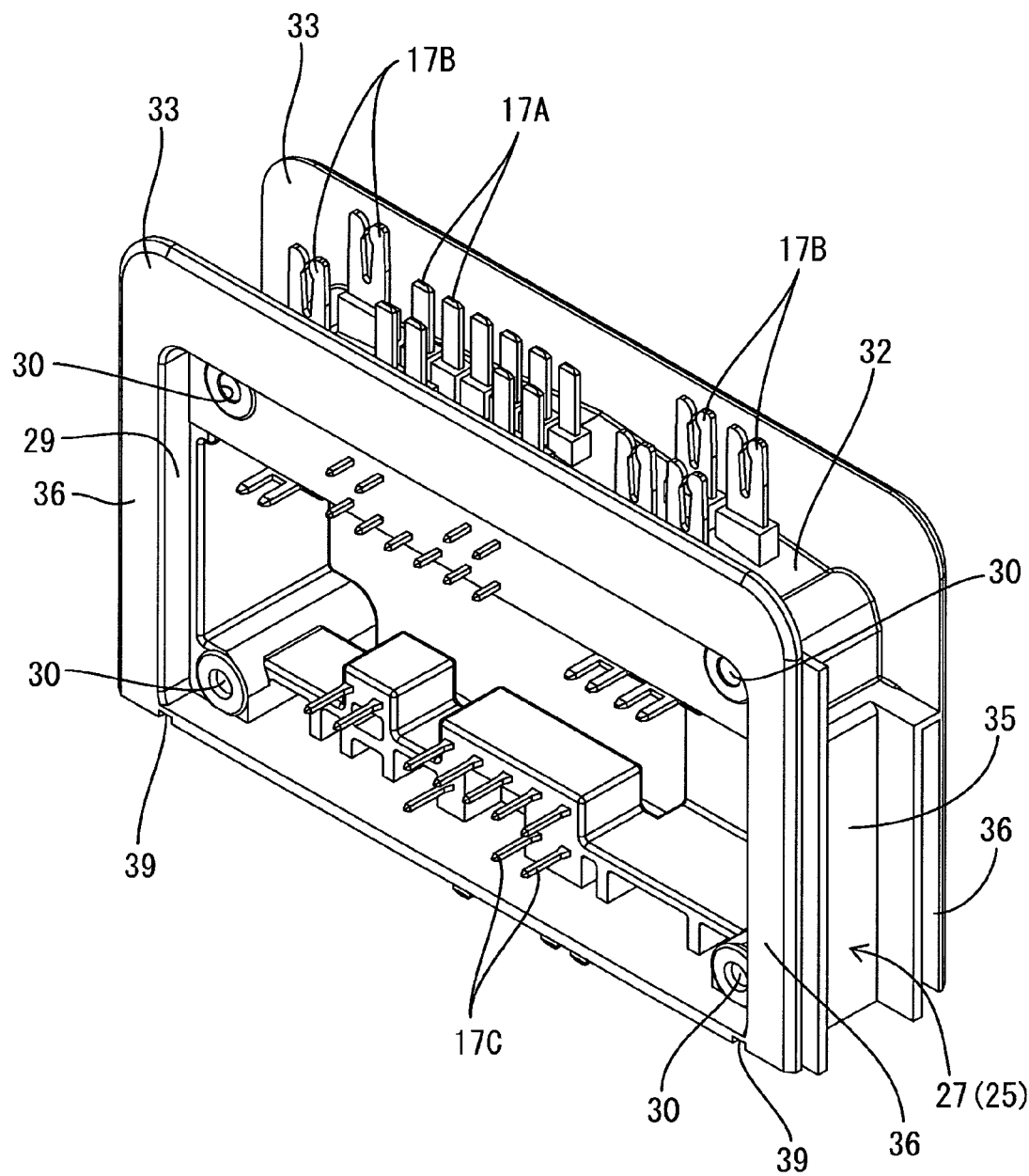

[Fig. 7]
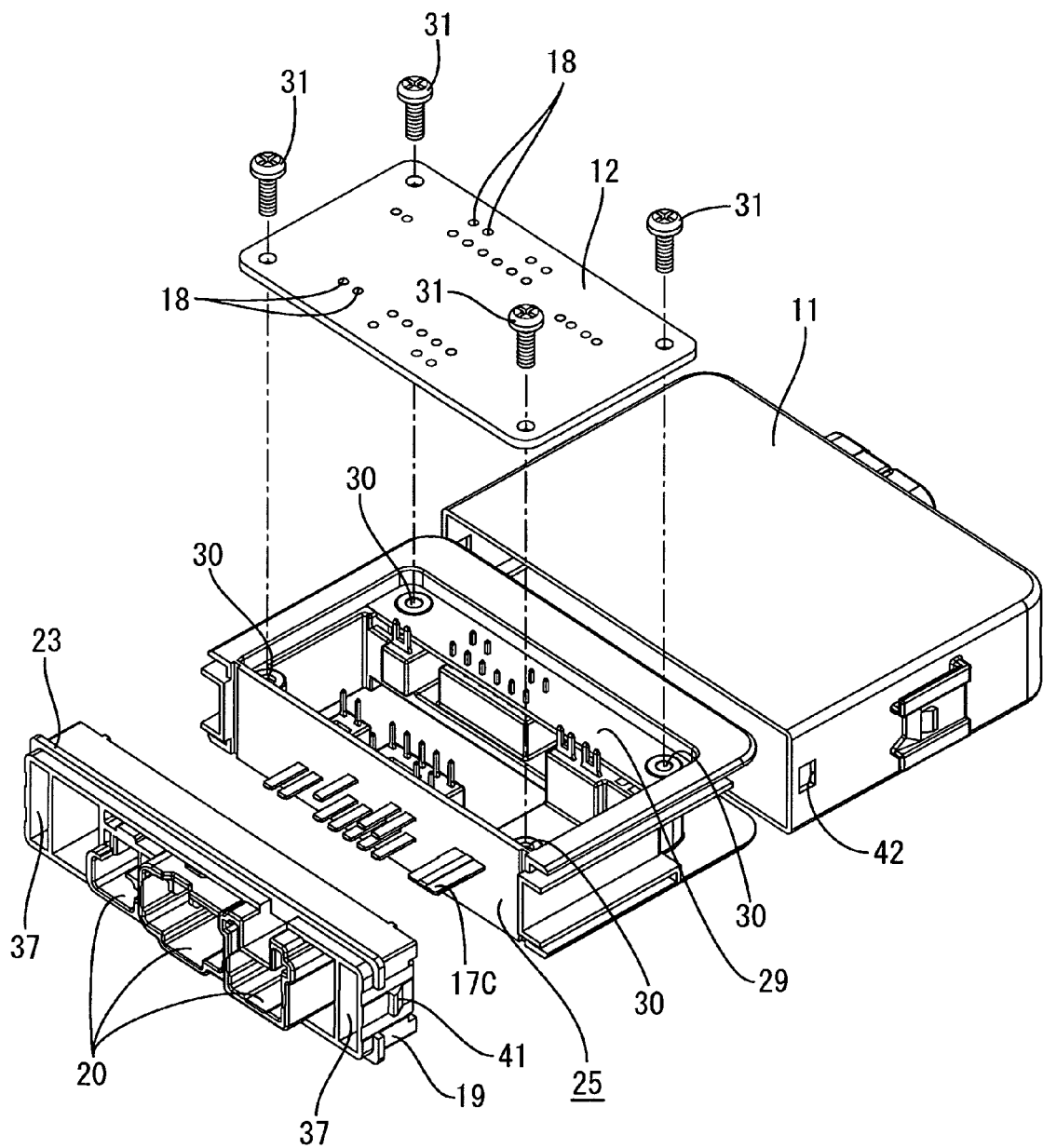

[Fig. 8]
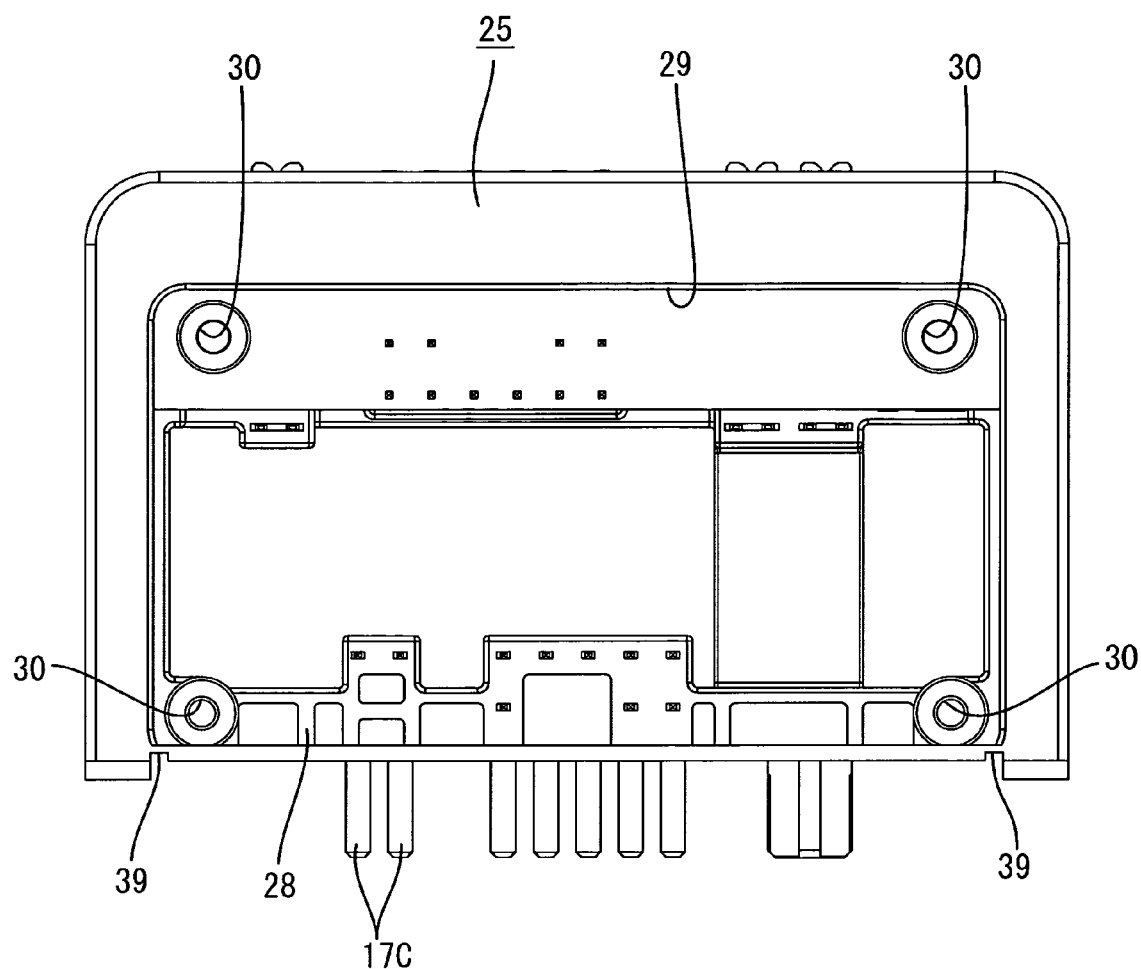

[Fig. 9]
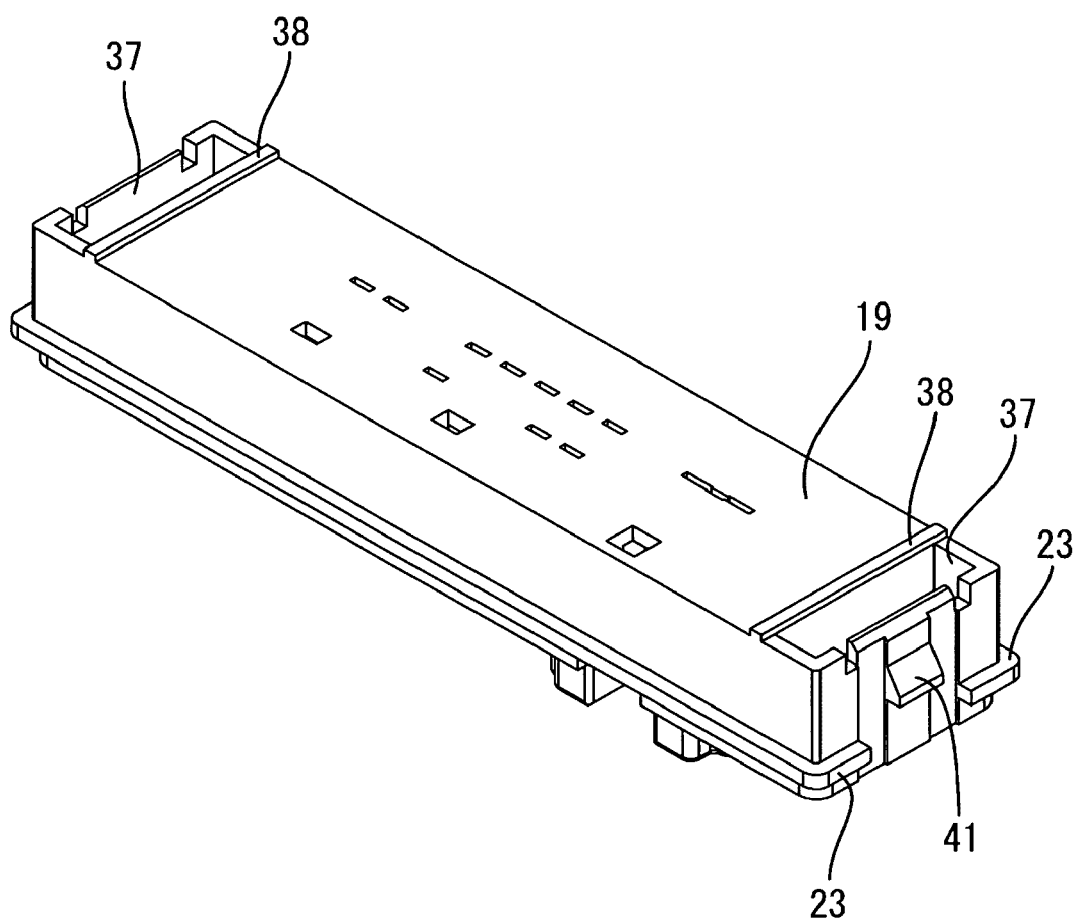

[Fig. 10]
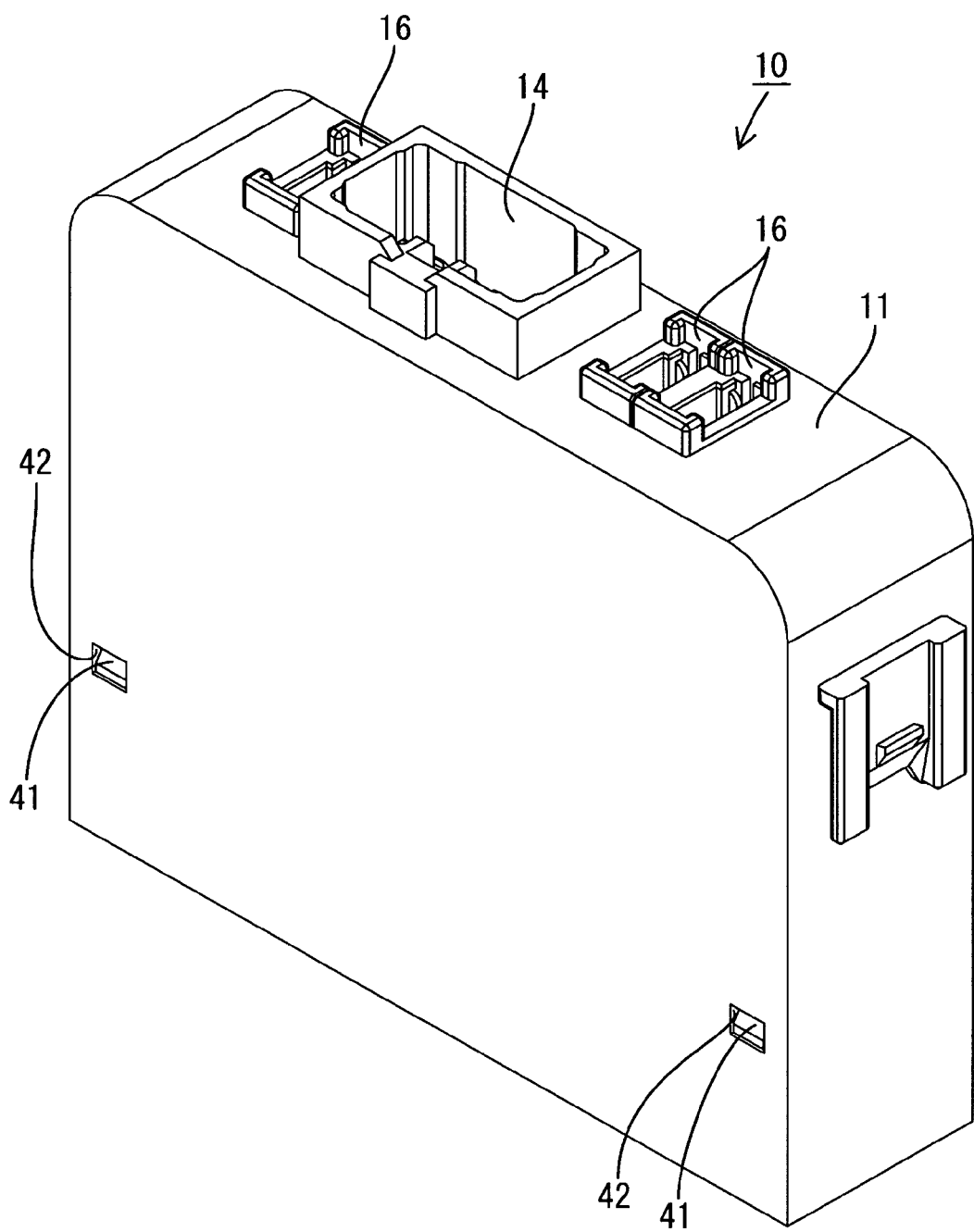

[Fig. 11]
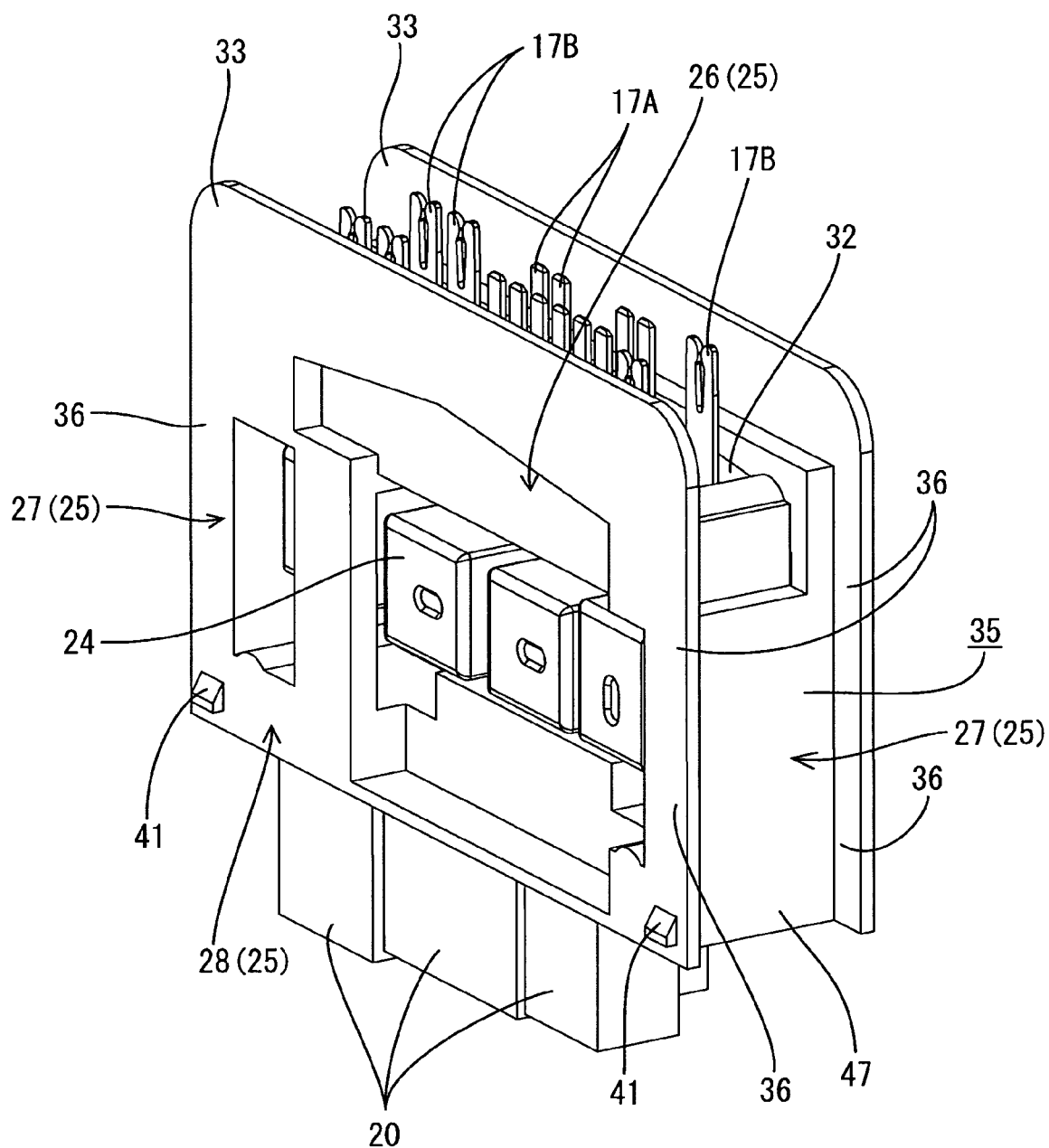

[Fig. 12]
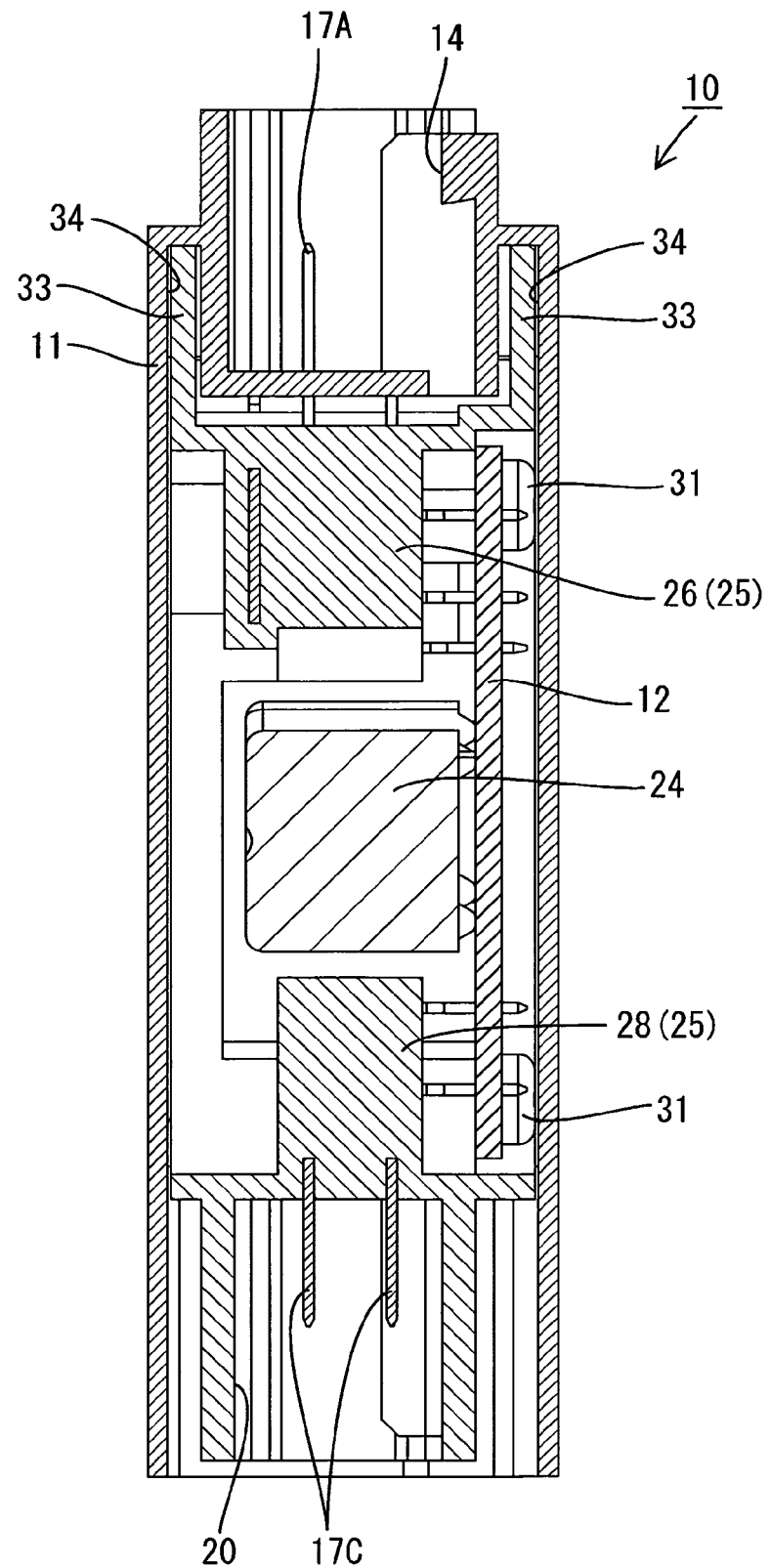

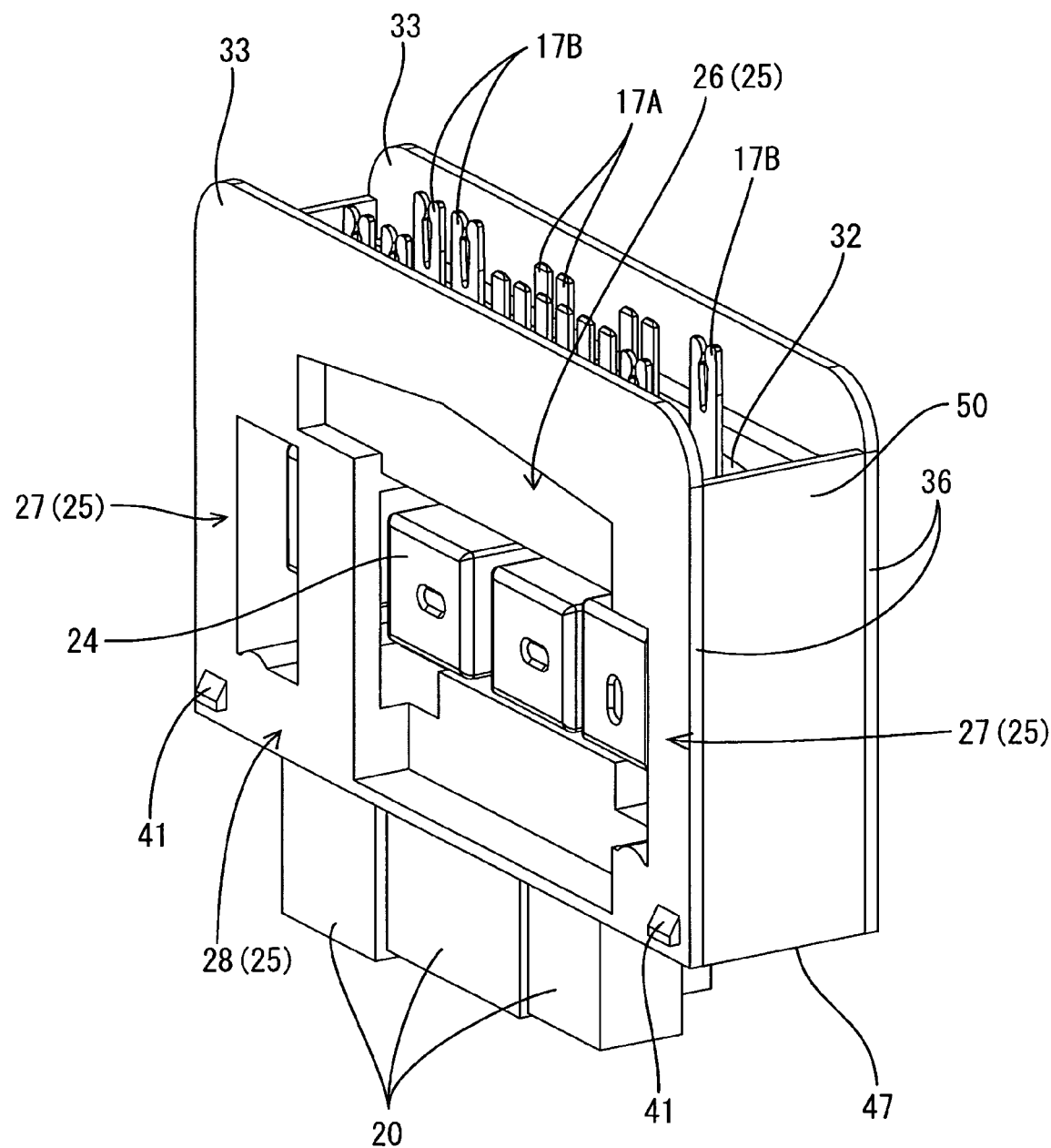
[Fig. 13]

[Fig. 14]
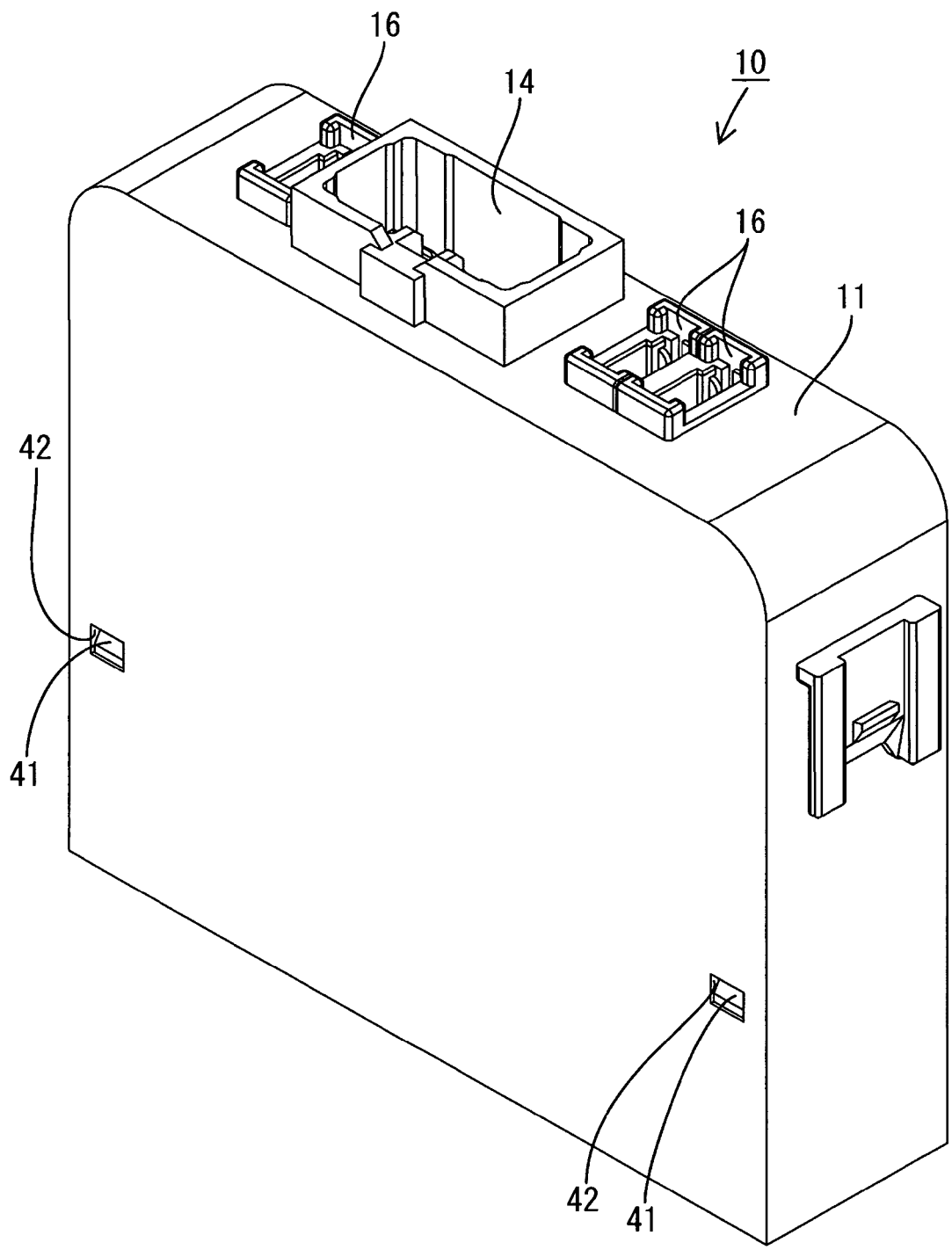

[Fig. 15]
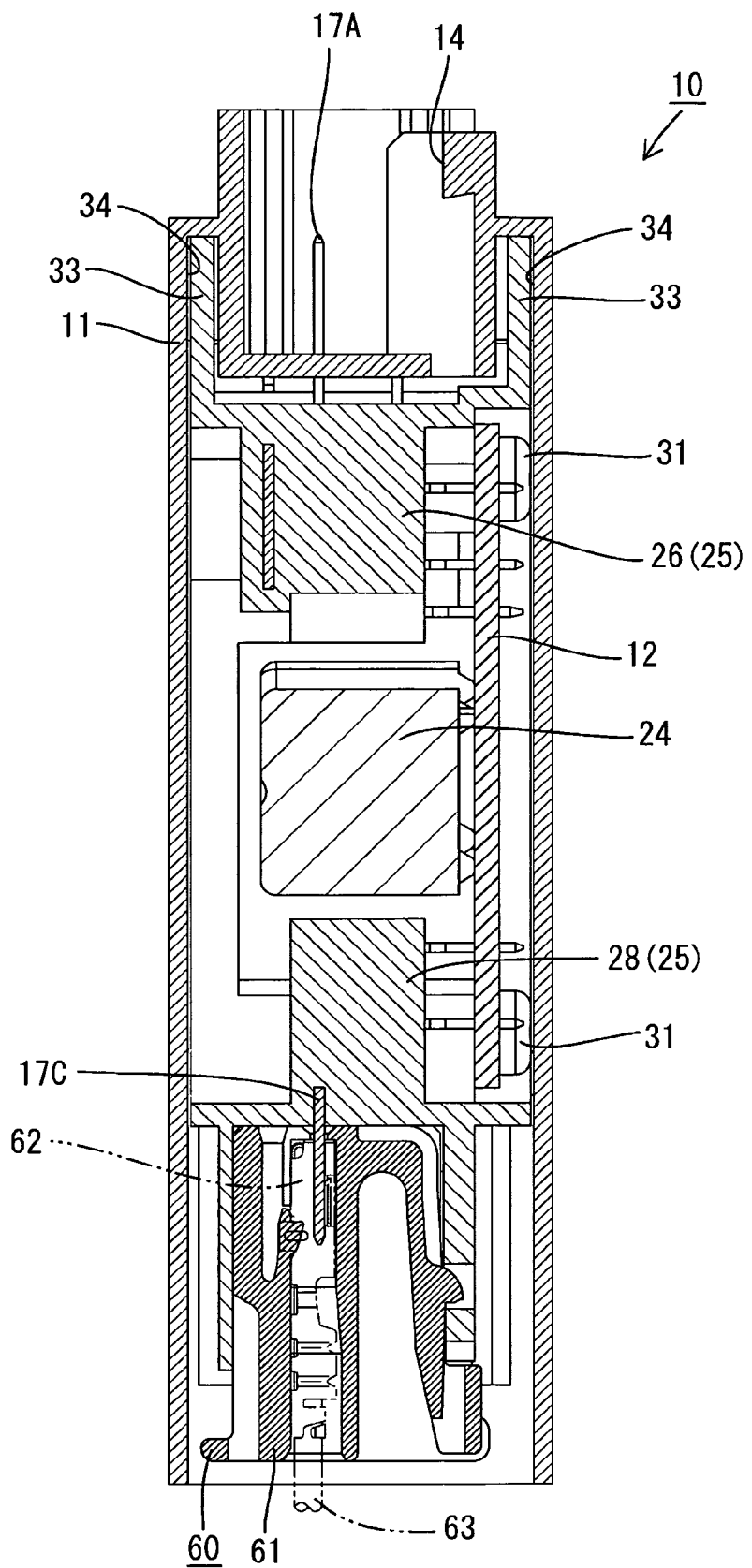

[Fig. 16]
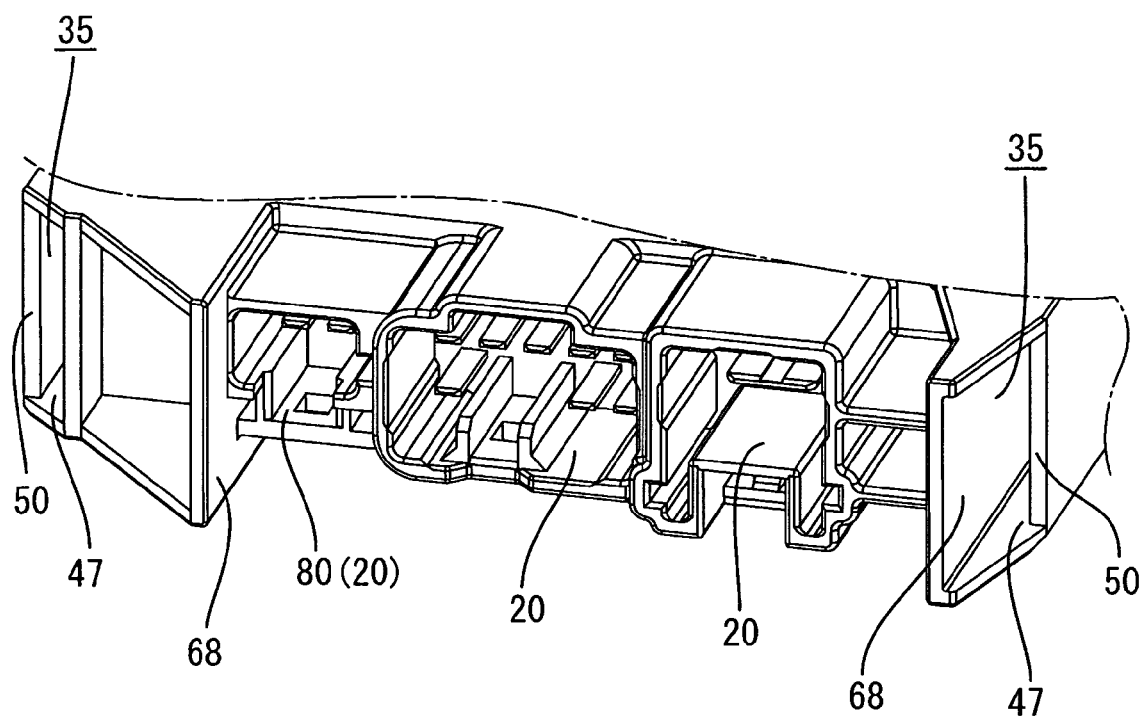

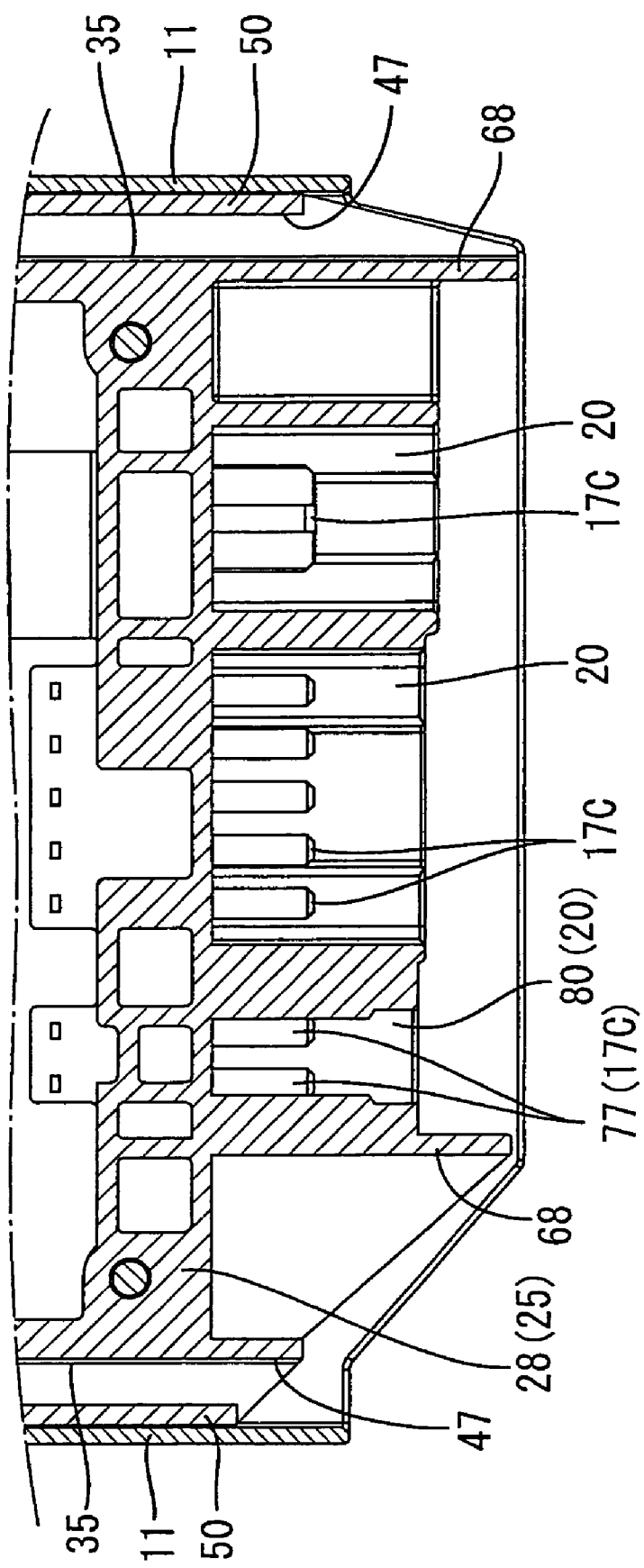

[Fig. 18]
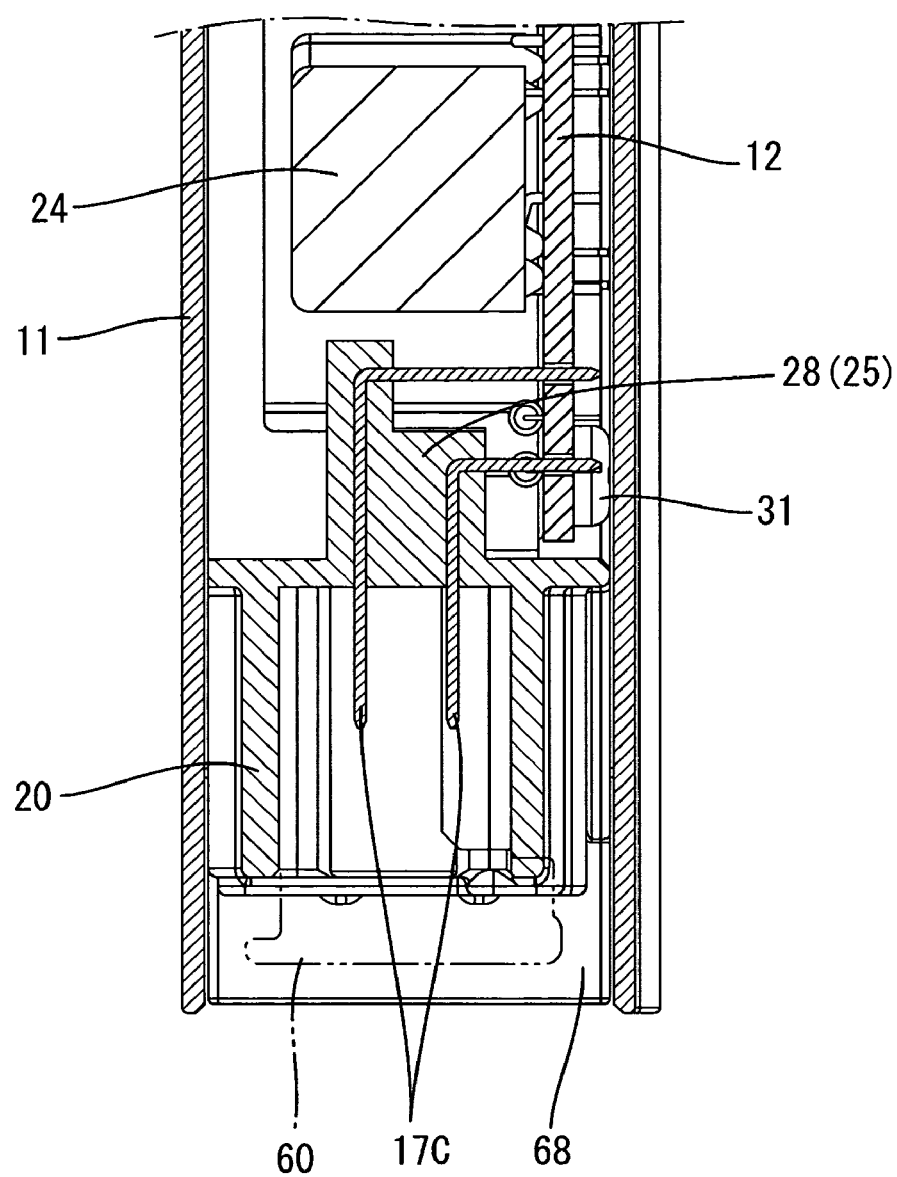

ELECTRICAL JUNCTION BOX WITH DRAINAGE PORTIONS

INCORPORATION BY REFERENCE

This application claims priority to JP 2008-138497 filed in Japan on May 27, 2008, the disclosure of which is hereby incorporated by reference in its entirety.

BACKGROUND

This invention relates to an electrical junction box in which a circuit board is contained in a casing.

Heretofore, an electrical junction box that is mounted in a motor vehicle to supply and shut out electrical currents to on-vehicle electrical components such as lamps and horns has been known, as disclosed in Patent Document 1. The electrical junction box contains in a casing a circuit board on which electronic parts are mounted. An upper part of the casing is provided with a mounting section that is open upward and is adapted to receive a mating member such as a connector.

For example, in the case where the electrical junction box is contained in an engine compartment in a motor vehicle, when water falls down onto the electrical junction box upon raining or vehicle-washing, there is a possibility that water will enter the casing through the mounting section provided on an upper part of the casing.

In the electrical junction box, connecting terminals are contained in the mounting section and are connected to a connector body, and the connector body is provided below the mounting section. An upper surface of the connector body is provided with a slope that drains water, which has entered the casing, through an end of the connector body. An end of the slope defines a drainage port. A duct is provided below the drainage port to be open downward, so that the water that has drained from the drainage port is drained out of the casing.
[Patent Document] JP 2003-348732 A However, according to the above construction, there is a possibility that the water that has reached the drainage port will flow around a lower surface of the connector body and will move toward the circuit board. Then, the water will attach to the circuit board to cause a short circuit in a circuit formed on the circuit board.

In view of the above problems, an object of the present invention is to provide an electrical junction box that can prevent water in a casing from attaching to a circuit board.

SUMMARY

An electrical junction box in accordance with the present invention may include: a casing; a mounting section that is provided on and is open in an upper wall in the casing to receive a mating member; a circuit board contained in the casing; an upper frame portion that is disposed below the mounting section in the casing to cover an upper part of the circuit board; side frame portions that extend downward from side edges of the upper frame portion and are disposed adjacent to sides of the circuit board; slopes that are formed on an upper surface of the upper frame portion and slant down to the side frame portions; and groove portions that extend in a vertical direction on outer surfaces of the side frame portions. The casing is provided with first drainage portions that are open at positions opposite lower end edges of the groove portions.

First, when water enters the casing through the mounting section that is open in the upper wall of the casing, the water that has entered the casing flows downward, and falls down onto an upper surface of the upper frame portion disposed below the mounting section. Since the upper frame portion covers an upper part of the circuit board, it is possible to prevent the water from attaching to the circuit board.

The water that has fallen down onto the upper surface of the upper frame portion flows on the slopes formed on the upper surface of the upper frame portion, and moves to the side frame portions. The water that has moved to the side frame portions is guided by groove portions formed on the outer surfaces of the side frame portions and extending in the vertical direction, and flows down in the groove portions. Since the side frame portions are disposed at the side positions of the circuit board and the groove portions are formed on the outer side surfaces of the side frame portions, it is possible to prevent the water from attaching to the circuit board.

The water that has reached the lower end edges of the groove portions flows downward, and is drained outside the casing through the first drainage portions that are open at the positions opposite the lower end edges of the groove portions. Thus, it is possible to prevent the water, which has entered the casing, from attaching to the circuit board.

The following embodiments in accordance with the present invention are preferable.

The casing may include a lower wall. The lower wall of the casing may be provided with the first drainage portions at positions opposite the lower end edges of the groove portions. The lower wall of the casing may include an upper surface having first water stop walls that project upward at positions adjacent to the first drainage portions.

According to the above construction, even if the water that has flowed down from the lower end edges of the groove portions does not fall down in the first drainage portions but falls down onto the upper surface of the lower wall of the casing, it is possible for the first water stop walls to prevent the water from moving to the circuit board.

Lower end edges of the side frame portions may be provided with a lower frame portion that covers a lower part of the circuit board. A lower surface of the lower frame portion may be provided at positions opposite the first water stop walls with first water stop grooves that contain the first water stop walls.

According to the above construction, since the first water stop walls are contained in the first water stop groove portions, a complex structure is formed between the first water stop walls and the first water stop groove portions. Thus, it is possible to further prevent the water, which has flowed from the first drainage portions and fallen down onto the upper surface of the lower wall of the casing, from moving to the circuit board.

A lower surface of the lower wall of the casing may be provided with a connector housing that is adapted to be coupled to a mating connector and is open downward. A terminal metal connected to the circuit board may be disposed in the connector housing.

According to the above construction, the electrical junction box may be coupled to a mating connector.

An electrical junction box may include: a casing that is open downward; a mounting section that is provided on and is open in an upper wall in the casing to receive a mating member; a circuit board contained in the casing; an upper frame portion that is disposed below the mounting section in the casing to cover an upper part of the circuit board; side frame portions that extend downward from side edges of the upper frame portion and are disposed adjacent to sides of the circuit board; slopes that are formed on an upper surface of the upper frame portion and slant down to the side frame portions; groove portions that extend in a vertical direction on outer surfaces of the side frame portions; and second drainage portions provided on lower end edges of the groove portions.

First, when water enters the casing through the mounting section that is open upward in the upper wall of the casing, the water in the casing flows downward, and falls down onto the upper surface of the upper frame portion disposed below the mounting section. Since the upper frame portion covers an upper part of the circuit board, it is possible to prevent the water from attaching to the circuit board.

The water that has fallen down onto the upper surface of the upper frame portion flows on the slopes formed on the upper surface of the upper frame portion, and moves to the side frame portions. The water that has moved to the side frame portions is guided by groove portions formed on the outer surfaces of the side frame portions and extending in the vertical direction, and flows down in the groove portions. Since the side frame portions are disposed at the side positions of the circuit board and the groove portions are formed on the outer side surfaces of the side frame portions, it is possible to prevent the water, which flows down in the groove portions, from attaching to the circuit board.

The water that has reached the second drainage portions provided on the lower end edges of the groove portions flows down, and is drained outside the casing. Thus, it is possible to prevent the water, which has entered the casing, from attaching to the circuit board.

Lower end edges of the side frame portions may be provided with a lower frame portion that covers a lower part of the circuit board. A lower surface of the lower frame portion may be provided with a connector housing that is adapted to be coupled to a mating connector and is open downward. A terminal metal connected to the circuit board may be disposed in the connector housing.

According to the above construction, the electrical junction box can be coupled to a mating connector.

A lower surface of the lower wall of the casing or a lower surface of the lower frame portion may be provided with second drainage portions extending downward in a vertical direction between the connector housing and the first or second drainage portions.

According to the above construction, it is possible for the second water stop walls to prevent the water, which has reached the first or second drainage portions, from entering the connector housing through the lower surface of the lower wall of the casing or the lower surface of the lower frame portion.

The lower end edges of the second water stop walls may be disposed below lower end edges of the mating connector coupled to the connector housing.

When water attaches to the mating connector coupled to the connector housing, there is a possibility that the water will enter the connector housing through a clearance between the connector housing and the mating connector by capillarity.

According to the above construction, even if the water that has reached the drainage portions flows on the outer side surfaces of the second water stop walls and reaches the lower end edges of the second water stop walls, it is possible to prevent the water from attaching to a clearance between the connector housing and the mating connector coupled to the connector housing.

The second water stop walls may share wall portions that constitute the connector housing.

According to the above construction, since the water can be prevented from entering the connector housing at a position immediately near the connector housing, it is possible to prevent the water from entering the connector housing.

The second water stop walls may share wall portions that constitute the first or second drainage portions.

According to the above construction, it is possible to simplify a structure in comparison with a structure in which the second water stop walls are formed at different positions.

A plurality of connector housings may be provided in the lower wall of the casing or in the lower frame portion. The connector housings may include a ground connector housing that together contain a plurality of ground terminal metals connected to ground lines on the circuit board.

According to the above construction, it is possible to prevent the adjacent terminal metals from causing a short circuit in comparison with a structure in which a plurality of terminal metals are under different potentials in the same connector housing.

The upper frame portion may be provided with a plurality of side frame portions. The slopes may slant downward from a central top on an upper surface of the upper frame portion to the side frame portions.

According to the above construction, it is possible to disperse an amount of water that flows on the slopes in comparison with a structure in which the top of the slopes is deviated from the central position of the upper surface of the upper frame portion. Consequently, it is possible to enhance a drainage function of the slopes as a whole.

The side frame portions may be provided with lid portions that are bridged between distal ends of a pair of side walls that define the groove portions to cover the groove portions.

For example, in the case where the electrical junction box is slanted, there will be a possibility that the water that flows in the groove portions will overflow the distal end edges of the side walls that constitute the groove portions. Then, there will be a possibility that the water that overflows the side walls will flow around the outer surfaces of the side frame portions and will move to the circuit board.

According to the above construction, even if the electrical junction box is slanted, it is possible to prevent the water that flows in the groove portions from overflowing the distal end edges of the side walls that constitute the groove portions.

The lower end edges of the side wall of the casing may be disposed below lower end edges of the mating connector coupled to the connector housing.

The water that has attached to the side walls of the casing flows down on the outer surface of the casing and reaches the lower end edges of the side walls of the casing. According to the above construction, it is possible to prevent the water that attaches to the lower end edges of the casing from attaching to the mating connector coupled to the connector housing.

According to the present invention, it is possible to prevent the water in the casing from attaching to the circuit board.

BRIEF DESCRIPTION OF THE DRAWINGS

FIG. 1 is a perspective view of a first embodiment of an electrical junction box in accordance with the present invention;

FIG. 2 is a front elevation view of the electrical junction box shown in FIG. 1;

FIG. 3 is a top plan view of the electrical junction box shown in FIG. 1;

FIG. 4 is a longitudinal section view of the electrical junction box taken along lines IV-IV in FIG. 2;

FIG. 5 is a cross section view of the electrical junction box taken along lines V-V in FIG. 3;

FIG. 6 is a perspective view of a frame body of the electrical junction box shown in FIG. 1;

FIG. 7 is an exploded perspective view of the electrical junction box shown in FIG. 1;

FIG. 8 is a back side view of the frame body shown in FIG. 6;

FIG. 9 is a perspective view of a connector block of the electrical junction box shown in FIG. 1;

FIG. 10 is a perspective view of a second embodiment of an electrical junction box in accordance with the present invention;

FIG. 11 is a perspective view of a frame body of the electrical junction box shown in FIG. 10;

FIG. 12 is a side section view of the second embodiment of the electrical junction box shown in FIG. 10;

FIG. 13 is a perspective view of a frame body in a third embodiment of the electrical junction box in accordance with the present invention;

FIG. 14 is a perspective view of a fourth embodiment of the electrical junction box in accordance with the present invention;

FIG. 15 is a side section view of the fourth embodiment of the electrical junction box shown in FIG. 14;

FIG. 16 is an enlarged perspective view of a main part of a fifth embodiment of an electrical junction box in accordance with the present invention;

FIG. 17 is an enlarged cross section view of a main part of the fifth embodiment shown in FIG. 16; and FIG. 18 is an enlarged side section view of a main part of a fifth embodiment shown in FIG. 16.

DETAILED DESCRIPTION OF EMBODIMENTS

First Embodiment

Referring now to FIGS. 1 to 9, a first embodiment, in which the present invention is applied to an electrical junction box 10 to be mounted in a motor vehicle, will be described below. The electrical junction box 10 according to the first embodiment contains a circuit board 12 in a casing 11. The electrical junction box 10 is disposed between a power supply (not shown) and on-vehicle electrical components (not shown) such as a lamp and a horn to supply and shut out electrical currents to the on-vehicle electrical components. Hereinafter, an upper side in FIG. 2 is defined as an "upper side" and a lower side in FIG. 2 is defined as a "lower side". Also, a right side in FIG. 4 is defined as a "front side" and a left side in FIG. 4 is defined as a "rear side".

(Casing 11)

As shown in FIGS. 1 to 4, the casing 11 is made of a synthetic resin material and is open at a lower side. A thickness dimension of the casing in a direction from a left front side to a right back side in FIG. 1 (a front and back direction) is set to be smaller than a width dimension of the casing 11 in a direction from a right front side to a left back side in FIG. 1, so that the casing 11 is formed in a flat configuration. As shown in FIGS. 3 and 5, an upper wall of the casing 11 is provided with an upper connector housing 14 (corresponding to a mounting section in the present invention) for supporting a mating connector 13 (corresponding to a mating member in the present invention) and a plurality of fuse-mounting sections 16 (corresponding to mounting sections in the present invention) for receiving a plurality (three in the first embodiment) of fuses 15 (corresponding to mating members in the present invention). The housing 14 and sections 16 are open at the upper side.

As shown in FIG. 4, terminal metals 17A are inserted into an inner wall of the upper connector housing 14 so that an upper end of each terminal metal 17A penetrates through the inner wall and projects into an inner space of the housing 14. A lower end of each terminal metal 17A is bent toward a rear side (a left side in FIG. 4) of the housing 14, is inserted into a receiving aperture 18 in the circuit board 12, and is connected to an electrical conductive path (not shown) on the circuit board 12 by means of, for example, a soldering process.

As shown in FIG. 5, terminal metals 17B are inserted into inner walls of the fuse-mounting sections 16 so that an upper end of each terminal metal 17B penetrates through the inner wall and projects into an inner space of each section 16. A lower end of each terminal metal 17B is bent toward a rear side of the section 16, is inserted into a receiving aperture 18 in the circuit board 12, and is connected to an electrical conductive path on the circuit board 12 by means of a known process, for example, a soldering process.

As shown in FIGS. 4 and 5, a connector block 19 (corresponding to a lower wall of the casing 11 in the present invention) made of a synthetic resin material is attached to a lower end portion of the casing 11 to close an opening in the casing 11. The connector block 19 is provided with a plurality (three in the first embodiment) of lower connector housings 20 (corresponding to a connector housing in the present invention) that are adapted to be coupled to mating connectors (not shown). The lower connector housings are open at the lower side.

As shown in FIG. 4, terminal metals 17C are inserted into an inner wall of the lower connector housings 20 so that a lower end of each terminal metal 17C penetrates through the inner wall and projects into an inner space of each housing 20. An upper end of each terminal metal 17C is bent toward a rear side (a left side in FIG. 4) of the housing 20, is inserted into a receiving aperture 18 in the circuit board 12, and is connected to an electrical conductive path (not shown) on the circuit board 12 by means of, for example, a soldering process.

As shown in FIG. 5, a pair of side walls at right and left sides of the connector block 19 is provided with lock protrusions 21 that project outward, respectively. On the other hand, a pair of side walls at right and left sides of the casing 11 is provided with lock receiving openings 22 that elastically engage the lock protrusions 21, respectively.

As shown in FIG. 9, a side wall of the connector block 19 is provided with a flange 23 that projects outward in a peripheral direction of the connector block 19. When a lower end edge of the casing 11 contacts the flange 23 from an upper side, the casing 11 is prevented from moving downward with respect to the connector block 19.

(Circuit Board 12)

As shown in FIG. 4, the circuit board 12 is contained in the casing 11 so that the circuit board 12 is disposed in a substantially vertical posture relative to an upper wall of the casing 11 (a so-called vertical arrangement). As shown in FIG. 7, the circuit board 12 is formed in a rectangular configuration. Electrical conductive paths (not shown) are formed on a surface of the circuit board 12 by means of a printed wiring process. An electronic part 24 (FIG. 4) such as a relay is mounted on the surface of the circuit board 12 and is connected to the electrical conductive paths by means of a known process, for example, a soldering process.

(Frame Body 25)

As shown in FIG. 4, a frame body 25 made of a synthetic resin is contained in the casing 11 so that the frame body 25 surrounds an outer periphery of the circuit board 12. As shown in FIG. 5, the frame body 25 includes an upper frame portion 26 that is disposed below the upper connector housing 14 and fuse-mounting sections 16 provided on the upper wall of the casing 11 to cover an upper part of the circuit board 12, two side frame portions 27 that extend downward from right and left end edges of the upper frame portion 26 in FIG. 5 and are disposed at sides of side edges of the circuit board 12, and a lower frame portion 28 that bridges lower end edges of the side frame portions 27 and are disposed below the circuit board 12.

As shown in FIG. 4, a back side (a left side in FIG. 4) of the frame body 25 is provided with a board-containing portion 29 that is adapted to contain the circuit board 12 and is recessed at a front side (a right side in FIG. 4). As shown in FIG. 7, the circuit board 12 and frame body 25 are secured to the board-containing portion 29 by screwing bolts 31 into screwed holes in four corners of the board-containing portion 29. A depth dimension of the recessed board-containing portion 29 is set to be equal to or slightly smaller than the sum of a thickness dimension of the circuit board 12 and a height dimension of a head of the bolt 31.

As shown in FIG. 4, the terminal metals 17A to be disposed in the upper connector housing 14, the terminal metals 17B to be disposed in the fuse-mounting sections 16, and the terminal metals 17C to be disposed in the lower connector housings 20 are insert-molded in the frame body 25. Consequently, the respective terminal metals 17A, 17B, and 17C penetrate the frame body 25 in a liquid-tight manner.

As shown in FIG. 4, the terminal metals 17A to be disposed in the upper connector housing 14 and the terminal metals 17B to be disposed in the fuse-mounting sections 16 penetrate the upper frame portion 26. The respective terminal metals 17A and 17B are insert-molded in the frame body 25 so that the bent areas of the terminal metals 17A and 17B are disposed in the upper frame portion 26.

Also, as shown in FIG. 4, the terminal metals 17C to be disposed in the lower connector housings 20 penetrate the lower frame portion 28. The terminal metals 17C are insert-molded in the lower frame portion 28 so that the bent areas of the terminal metals 17C are disposed in the lower frame portion 28.

(Drainage Structure)

As shown in FIG. 5, an upper surface of the upper frame portion 26 is provided with slopes 32 that extend downward from a central top position toward the pair of side frame portions 27 at the right and left ends. As shown in FIG. 5, the slopes 32 are formed in a mountain-like configuration taken from a front and back side direction (a direction penetrating the paper in FIG. 5). The slopes 32 are disposed below the upper connector housing 14 and fuse-mounting sections 16 provided on the upper wall of the casing 11.

As shown in FIG. 4, end edges at a front side (a right side in FIG. 4) and at a back side (a left side in FIG. 4) of the upper frame portion 26 are provided with upper water stop walls 33 projecting upward, respectively.

Also, as shown in FIG. 4, a lower surface of the upper wall of the casing 11 is provided with upper water stop groove portions 34 that are recessed upward to contain the upper water stop walls 33, respectively. Thus, a complex structure is formed between the upper water stop walls 33 and the upper water stop groove portions 34. Consequently, it is possible to prevent water that has fallen down onto the upper surface of the upper frame portion 26 from flowing around the upper water stop walls 33 to move to the circuit board 12.

As shown in FIG. 6, outer side surfaces of a pair of side frame portions 27 are provided with groove portions 35 extending in a vertical direction. Each groove portion 35 is surrounded by an end edge at a front side (a left front side in FIG. 6), an end edge at a back side (a right back side in FIG. 6), and a pair of side walls 36 projecting outward and extending in a vertical direction.

As shown in FIG. 5, positions opposite lower end edges of the groove portions 35 of the connector block 19 are provided with first drainage portions 37 that are open at lower sides. Each of the first drainage portions 37 is formed on right and left end portions of the connector block 19.

As shown in FIG. 5, an upper surface (upper side surface in FIG. 5) at positions near the first drainage positions of the connector block 19 is provided with first water stop walls 38 projecting upward. As shown in FIG. 9, each of the first water stop walls 38 extends on an upper surface of the connector block 19 in a front and back direction (a direction from a left front side to a right back side in FIG. 9). In the first embodiment, the first water stop walls 38 are disposed on inside positions in a right and left direction with respect to the first drainage portions 37.

As shown in FIG. 5, a lower surface (a lower side surface in FIG. 5) of the lower frame portion 28 is provided with first water stop groove portions 39 that are recessed at positions opposite the first water stop walls 38 to contain the first walls 38. As shown in FIG. 8, each of the first water stop groove portions 39 is formed on a lower surface of the lower frame portion 28 to extend in a front and back direction (a direction penetrating the paper of FIG. 8). When the first water stop walls 38 are contained in the first water stop groove portions 39, a complex structure is formed between the first water stop walls 38 and the first water stop groove portions 39.

Next, an operation and an effect of the first embodiment will be described below. As shown in FIG. 5, when water falls onto the electrical junction box 10 upon raining, vehicle-washing, or the like, the water will enter the casing 11 through the upper connector housing 14 and fuse-mounting sections 16 that are open in the upper wall of the casing 11 (see an arrow A). Then, the water that has entered the casing 11 will flow downward, and will fall down onto the upper surface of the upper frame portion 26 disposed below the upper connector housing 14 and fuse-mounting sections 16. Since the upper frame portion 26 covers an upper part of the circuit board 12, it is possible to prevent the water from attaching to the circuit board 12.

The water that has fallen down onto the upper surface of the upper frame portion 26 will flow on the slopes 32 formed on the upper surface of the upper frame portion 26, and will move to the side frame portions 27 disposed on the right and left sides in FIG. 5 (see arrows B and C in FIG. 5). The water that has moved to the side frame portions 27 will be guided by groove portions 35 formed on the outer surfaces of the side frame portions 27 and extending in the vertical direction, and will flow down in the groove portions 35 (see arrows D and E in FIG. 5). Since the side frame portions 27 are disposed at the side positions of the circuit board 12 and the groove portions 35 are formed on the outer side surfaces of the side frame portions 27, it is possible to prevent the water from attaching to the circuit board 12.

The water that has reached the lower end edges of the groove portions 35 will flow down, and will be drained outside the casing 11 from the first drainage portions 37 that are open at the positions opposite the lower end edges of the groove portions 35 in the connector block 19 (see arrows F and G in FIG. 5). Thus, it is possible to prevent the water, which has entered the casing 11, from attaching to the circuit board 12.

Furthermore, in the first embodiment, the connector block 19 is attached to the lower end of the casing 11. The first water stop walls 38 are formed on the upper surface of the connector block 19 to project upward at the positions near the first drainage portions 37. Thus, even if the water that has flowed down from the lower end edges of the groove portions 35 does not fall down in the first drainage portions 37, but falls down onto the upper surface of the connector housing 19, it is possible for the first water stop walls 38 to prevent the water from moving to the circuit board 12.

In addition, in the first embodiment, the lower surface at the positions opposite the first water stop walls 38 of the lower frame portion 28 disposed below the circuit board 12 is provided with the first water stop groove portions 39 that contain the first water stop walls 38. Thus, when the first water stop walls 38 are contained in the first water stop groove portions 39, a complex structure is formed between the first water stop walls 38 and the first water stop groove portions 39. Consequently, it is possible to further prevent the water, which has flowed from the first drainage portions 37 and has fallen down onto the upper surface of the connector housing, from moving to the circuit board 12.

Also, in the first embodiment, the upper surface of the upper frame portion 26 is provided with the slopes 32 that extend downward from a central top position toward the pair of side frame portions 27. Thus, it is possible to reduce an amount of water that flows on the slopes 32 in comparison with a structure in which the top position of the slopes 32 is deviated from the central position of the upper surface of the upper frame portion 26. Consequently, it is possible to enhance a drainage function of the slopes 32, as a whole.

Second Embodiment

Next, a second embodiment of the electrical junction box 10 in accordance with the present invention will be described below by referring to FIGS. 10 to 12. In the second embodiment, a front side (a left front side in FIG. 11) at opposite end positions in a direction from a right front side to a left back side (in FIG. 10) of the lower frame portion 28 of the frame body 25 is provided with a pair of lock protrusions 41 that project toward the front side, respectively. Although a detailed structure is not illustrated in the drawings, a back side (a right back side in FIG. 11) of the lower frame portion 28 of the frame body 25 is also provided with a pair of same lock protrusions 41.

As shown in FIG. 10, side wall portions at positions opposite the lock portions 41 of the casing 11 is provided with lock receiving openings 42 that elastically engage the lock protrusions 41, respectively.

As shown in FIG. 11, a lower surface of the lower frame portion 28 of the frame body 25 is provided with a plurality (three in the second embodiment) of lower connector housings 20 (corresponding to a connector housing in the present invention) that are open at a lower side and are adapted to be coupled to mating connectors connected to wire harnesses (not shown).

As shown in FIG. 12, terminal metals 17C are disposed in the lower connector housings 20 to penetrate back side walls of the lower connector housings 20. Upper ends of the terminal metals 17C are bent toward the back sides (right sides in FIG. 12) of the housings 20, are inserted into receiving apertures 18 in the circuit board 12, and are connected to the electrical conductive paths (not shown) formed on the circuit board 12 by means of, for example, a soldering process.

As shown in FIG. 11, lower end edges of the groove portions 35 formed in an outer surface of the side frame portions 27 define second drainage portions 47. The second drainage portions 47 are exposed from the downward opening at a lower side in the casing 11.

As shown in FIG. 12, the lower end edges of the side walls of the casing 11 are disposed at a slightly lower position than lower end edges of the lower connector housings 20.

Since most constructions except the above constructions in the second embodiment are substantially the same as the constructions in the first embodiment, duplicated descriptions are omitted by giving the same signs to the same elements in the second embodiment.

Next, an operation and an effect of the second embodiment of the electrical junction box 10 in accordance with the present invention will be described below. When water enters the casing 11 through the upper connector housing 14 and fuse-mounting sections 16 that are open upward in the upper wall of the casing 11, the water in the casing 11 will flow down, and will fall down onto the upper surface of the upper frame portion 26 disposed below the upper connector housing 14 and fuse-mounting sections 16. Since the upper frame portion 26 covers an upper part of the circuit board 12, it is possible to prevent the water from attaching to the circuit board 12.

The water that has fallen down onto the upper surface of the upper frame portion 26 will flow on the slopes 32 formed on the upper surface of the upper frame portion 26, and will move to the side frame portions 27. The water that has moved to the side frame portions 27 will be guided by groove portions 35 formed on the outer surfaces of the side frame portions 27 and extending in the vertical direction, and will flow down in the groove portions 35. Since the side frame portions 27 are disposed at the side positions of the circuit board 12 and the groove portions 35 are formed on the outer side surfaces of the side frame portions 27, it is possible to prevent the water, which flows down in the groove portions 35, from attaching to the circuit board 12.

The water that has reached the second drainage portions 47 provided on the lower end edges of the groove portions 35 will flow down, and will be drained outside the casing 11. Thus, it is possible to prevent the water, which has entered the casing 11, from attaching to the circuit board 12.

Also, in the second embodiment, the lower end edges of the casing 11 are disposed at a lower position than a lower end edge of the lower connector housings 20. Thus, when the water that has flowed down on the outer surface of the casing 11 reaches the lower end edge of the casing 11, it is possible to prevent the water from attaching to the lower end edges of the lower connector housings 20. Consequently, it is possible to prevent the water from attaching to the lower end edges of the lower connector housings 20 and from entering the lower connector housings 20 through clearances between the lower connector housings 20 and the mating connectors 13 coupled to the housings 20 by capillarity.

Third Embodiment

Next, a third embodiment of the electrical junction box 10 in accordance with the present invention will be described below by referring to FIG. 13. In the third embodiment, the side frame portion 27 disposed at a right front side in FIG. 13 is provided with a lid portion 50 that is bridged between the pair of side walls 36, which define the groove portion 35, to cover the groove portion 35. The lid portion 50 covers areas from upper ends to lower ends of the groove portion 35. Although a detailed structure is not illustrated in FIG. 13, the side frame portion 27 disposed at a left back side is also provided with the same lid portion 50.

Since most constructions except the above constructions in the third embodiment are substantially the same as the constructions in the second embodiment, duplicated descriptions are omitted by giving the same signs to the same elements in the second embodiment.

In the case where the electrical junction box 10 is slanted, for example, when a motor vehicle is stopped on curbstones, there will be a possibility that the water that flows in the groove portions 35 will overflow the distal end edges of the side walls 36 that constitute the groove portions 35. Then, there will be a possibility that the water that overflows the side walls 36 will flow around the outer surface of the side frame portion 27 and will move to the circuit board 12.

According to the above construction, even if the electrical junction box 10 is slanted, it is possible to prevent the water that flows in the groove portions 35 from overflowing the distal end edges of the side walls 36 that constitute the groove portions 35.

Fourth Embodiment

Next, a fourth embodiment of the electrical junction box 10 in accordance with the present invention will be described below by referring to FIGS. 14 and 15. FIG. 15 shows mating connectors 60 that are coupled to the lower connector housings 20. Each mating connector 60 includes a female connector housing 61 that contains a female terminal metal 62. An electrical wire 63 is connected to the female terminal metal 62. When the mating connectors 60 are coupled to the lower connector housings 20, the female terminal metals 62 are electrically connected to the terminal metals 17C disposed in the lower connector housings 20.

As shown in FIG. 15, the lower end edges of the side walls of the lower connector housings 20 are disposed at a lower position than the lower end edges of the mating connectors 60 coupled to the lower connector housings 20.

Since most constructions except the above constructions in the fourth embodiment are substantially the same as the constructions in the second embodiment, duplicated descriptions are omitted by giving the same signs to the same elements in the second embodiment.

According to the fourth embodiment, the water that has attached to the outer surface of the casing 11 will flow down on the outer surfaces of the side walls of the casing 11, and will reach the lower end edge of the casing 11. According to the above construction, even if the water that has flowed on the outside of the casing 11 reaches the lower end edges of the side walls of the casing 11, it is possible to prevent the water from attaching to the lower end edges of the mating connectors 60 that are coupled to the lower connector housings 20. Consequently, it is possible to prevent the water from attaching to the lower end edges of the mating connectors 60 and from entering the lower connector housings 20 through clearances between the lower connector housings 20 and the mating connectors 60 by capillarity.

Fifth Embodiment

Next, a fifth embodiment of the electrical junction box 10 in accordance with the present invention will be described below by referring to FIGS. 16 to 18. As shown in FIG. 17, a lower surface of the lower frame portion 28 is provided with a plurality (three in the fifth embodiment) of lower connector housings 20 (corresponding to a connector housing in the present invention) that are open at a lower side.

As shown in FIG. 17, the lower surface of the lower frame portion 28 is provided with a pair of second water stop walls 68 that are disposed between the lower connector housings 20 and the pair of second drainage portions 47 and extend downward.

As shown in FIG. 17, a plurality (two in the fifth embodiment) of ground terminal metals 77 are connected to ground lines formed on the circuit board 12 and are contained in the lower connector housing 20 disposed on a left end side in FIG. 17. This lower connector housing 20 that contains the ground terminal metals 77 defines a ground connector housing 80.

The second water stop wall 68 disposed on a left side in FIG. 17 shares a side wall of the ground connector housing 80. As shown in FIG. 16, an opening in each second drainage portion 47 is cut off in a beveled manner toward the ground connector housing 80.

On the other hand, a plurality (five in the fifth embodiment) of terminal metals 17C are contained in the lower connector housing 20 disposed on a central part in FIG. 17. The terminal metals 17C are connected to electrical conductive paths that are formed on the circuit board 12 and are different from the ground lines.

A single terminal metal 17C is contained in the lower connector housing 20 disposed on a right end in FIG. 17. The terminal metal 17C is connected through a mating connector (not shown) to a power source.

The second water stop wall 68 disposed on a right side in FIG. 17 shares a side wall of the second drainage portion 47 disposed at a right end side in FIG. 17. As shown in FIG. 16, an opening of each second drainage portion 47 is cut off in a beveled manner toward the inside in a right and left direction.

As shown in FIG. 18, the lower end edges of the second water stop walls 68 are disposed at a lower position than the lower end edges of the mating connectors 60 coupled to the lower connector housings 20.

Also, as shown in FIG. 18, the lower end edges of the side walls of the casing 11 are disposed at a lower position than the lower end edges of the mating connectors 60 coupled to the lower connector housings 20.

Since most constructions except the above constructions in the fifth embodiment are substantially the same as the constructions in the third embodiment, duplicated descriptions are omitted by giving the same signs to the same elements in the second embodiment.

In the case where the electrical junction box 10 is slanted, for example, when a motor vehicle is stopped on curbstones, there will be a possibility that the water that reaches the second drainage portions 47 through the groove portions 35 will flow down on a lower surface of the lower frame portion 28, will reach the lower connector housings 20, and will enter the lower connector housings 20.

In view of the above possibility, in the fifth embodiment, a lower surface of the lower frame portion 28 is provided with a pair of second water stop walls 68 that extend downward in a vertical direction between the lower connector housings 20 and the second drainage portions 47. It is possible for the second water stop walls 68 to prevent the water, which has reached the second drainage portions 47, from flowing down on the lower surface of the lower frame portion 28 and entering the lower connector housings 20.

Also, in the fifth embodiment, the lower end edges of the second water stop walls 68 are disposed at a lower position than the lower end edges of the lower connector housings 20. Thus, when the water that has flowed down on the surfaces of the second water stop walls 68 reaches the lower end edges of the second water stop walls 68, it is possible to prevent the water from attaching to the lower end edge of the lower connector housing 20. Consequently, it is possible to prevent the water from attaching to the lower end edges of the mating connector housings 60 coupled to the lower connector housings 20. Consequently, it is possible to surely prevent the water from attaching to the lower end edges of the mating connectors 60 and from entering the lower connector housings 20 through clearances between the lower connector housings 20 and the mating connector housings 60 by capillarity.

In the fifth embodiment, the second water stop walls 68 share side walls that constitute the lower connector housings 20. Thus, since the second water stop walls 68 can prevent water from entering the lower connector housings 20 immediately near the housings 20, it is possible to effectively prevent water from entering the lower connector housings 20.

Also, in the fifth embodiment, the second water stop walls 68 share wall portions of the second drainage portions 47. Thus, it is possible to simplify a structure of the electrical junction box 10 in comparison with a structure in which additional second water stop walls 68 are provided.

Also, in the fifth embodiment, the lower surface of the lower frame portion 28 is provided with a plurality of lower connector housings 20. These plural connector housings 20 include a ground connector housing 80 that together contains a plurality (two in the fifth embodiment) of ground terminal metals 77 connected to ground lines on the circuit board 12. Thus, even if water enters the ground connector housing 80 and the water attaches to adjacent ground terminal metals 77, since the ground terminal metals 77 are under the same potential, there is little possibility that a short circuit will occur between the ground terminal metals 77. In result, it is possible to prevent a short circuit between the adjacent terminal metals 17C in comparison with the case where a plurality of terminal metals 17C under different potentials are contained in the same lower connector housing.

Other Embodiments

It should be noted that the present invention is not limited to the embodiments described above and illustrated in the drawings. For example, the following embodiments will fall into the technical scope of the present invention.

(1) Although the upper frame portion 26 is provided with the slopes that slant downward from a central top of the upper surface of the upper frame portion 26 toward the pair of side frame portions 27 in the above embodiments, the present invention is not limited to these embodiments. The slopes 32 may be slanted downward from a top deviated to a position near one of the side frame portions 27 toward the side frame portions 27. So long as the slopes 32 slant downward to the respective side frame portions 27, the slopes 32 may be formed into any configuration, as required.

(2) Although the circuit board 12 is contained in the casing 11 so that the circuit board 12 is disposed perpendicular to the upper wall of the casing 11 in the above embodiments, the present invention is not limited to these embodiments. The circuit board 12 may be contained in the casing 11 so that the circuit board 12 is disposed parallel to the upper wall of the casing 11 (in a so-called horizontal arrangement). The circuit board 12 may be contained in the casing 11 in any posture, as required.

(3) Although the connector block 19 is not provided on the lower surface with the second water stop walls 68 in the first embodiment, the present invention is not limited to the first embodiment. The lower surface of the connector block 19 may be provided with the second water stop walls 68 that extend downward in a vertical direction at a position between the lower connector housings 20 and the first drainage portions 37. Also, in this case, the second water stop walls 68 may share wall portions that constitute the lower connector housings 20.

(4) Although one of the pair of second water stop walls 68 shares the wall portion that constitutes the lower connector housing 20 while the other wall shares the wall portion that constitute the second drainage portion 47 in the fifth embodiment, the present invention is not limited to the fifth embodiment. The second water stop walls 68 may be formed into portions different from the wall portions that constitute the lower connector housings 20 or into wall portions that constitute the second drainage portions 47.

(5) Although the upper surface of the connector block 19 is provided with the first water stop walls 38 in the first embodiment, the first water stop walls 38 may be omitted. Also, although the lower surface of the lower frame portion 28 is provided with the first water stop groove portions 39 in the first embodiment, the first water stop groove portions 39 may be omitted.

What is claimed is:

1. An electrical junction box comprising:
   a casing having first drainage portions;
   a mounting section that is disposed on and is open in an upper wall of the casing to receive a mating member;
   a circuit board housed in the casing and having an upper part, a lower part and sides;
   an upper frame portion having side edges and an upper portion and being disposed below the mounting section in the casing to cover the upper part of the circuit board;
   side frame portions having outer surfaces and lower end edges and extending downward from the side edges of the upper frame portion, the side frame portions being disposed adjacent to the sides of the circuit board;
   slopes that are formed on the upper surface of the upper frame portion and slant downward to the side frame portions; and
   groove portions having lower end edges and extending in a vertical direction on the outer surfaces of the side frame portions, the first drainage portions of the casing being open at positions opposite the lower end edges of the groove portions.

2. The electrical junction box of claim 1, wherein the upper frame portion comprises an upper surface having a central top portion, the slopes slanting downward from the central top portion on the upper surface of the upper frame portion to the side frame portions.

3. The electrical junction box of claim 1, wherein the groove portions are defined by a pair of side walls having distal ends, the side frame portions being provided with lid portions that are bridged between the distal ends of the pair of side walls that define the groove portions to cover the groove portions.

4. The electrical junction box of claim 1, wherein the casing comprises first water stop walls and a lower wall having an upper surface, the lower wall of the casing comprising the first drainage portions at positions opposite the lower end edges of the groove portions, the first water stop walls being disposed on the upper surface of the lower wall of the casing and projecting upward at positions adjacent to the first drainage portions.

5. The electrical junction box of claim 4, wherein a lower frame portion that covers the lower part of the circuit board is disposed on the lower end edges of the side frame portions, the lower frame portion having a lower surface, first water stop grooves including the first water stop walls being disposed on the lower surface of the lower frame portion at positions opposite the first water stop walls.

6. The electrical junction box of claim 5, wherein ground lines are disposed on the circuit board, and wherein a plurality of connector housings are disposed in one of the lower wall of the casing and the lower frame portion, and the plurality of connector housings comprise a ground connector housing that together comprise a plurality of ground terminal metals connected to the ground lines on the board.

7. The electrical junction box of claim 4, wherein a connector housing that is adapted to be coupled to a mating connector and is open downward is disposed on the lower surface of the lower wall of the casing, and a terminal metal connected to the circuit board is disposed in the connector housing.

8. The electrical junction box of claim 7, wherein second drainage portions extending downward in a vertical direction are disposed on one of the lower surface of the lower wall of the casing and the lower surface of the lower frame portion between the connector housing and one of the first drainage portions and the second draining portions.

9. The electrical junction box of claim 8, wherein the mating connector coupled to the connector housing comprises lower end edges, second water stop walls having lower end edges being disposed below the lower end edges of the mating connector coupled to the connector housing.

10. The electrical junction box of claim 9, wherein the second water stop walls share wall portions that constitute the connector housing.

11. The electrical junction box of claim 9, wherein the second water stop walls share wall portions that constitute one of the first drainage portions and the second drainage portions.

12. The electrical junction box of claim 9, wherein the lower end edges of the side wall of the casing are disposed below the lower end edges of the mating connector coupled to the connector housing.

13. An electrical junction box comprising:
a casing that is open downward;
a mounting section that is disposed on and is open in an upper wall in the casing to receive a mating member;
a circuit board housed in the casing and having an upper part, a lower part and sides;
an upper frame portion having side edges and an upper surface and being disposed below the mounting section in the casing to cover the upper part of the circuit board;
side frame portions having outer surfaces and lower end edges and extending downward from the side edges of the upper frame portion, the side frame portions being disposed adjacent to the sides of the circuit board;
slopes that are formed on the upper surface of the upper frame portion and slant downward to the side frame portions;
groove portions having lower end edges and extending in a vertical direction on the outer surfaces of the side frame portions; and
second drainage portions disposed on the lower end edges of the groove portions.

14. The electrical junction box of claim 13, wherein a lower frame portion that covers the lower part of the circuit board is disposed on the lower end edges of the side frame portions, a connector housing that is adapted to be coupled to a mating connector and is open downward being disposed on the lower surface of the lower frame portion, and a terminal metal connected to the circuit board being disposed in the connector housing.

* * * * *